(12) United States Patent
Zou et al.

(10) Patent No.: US 8,760,785 B1
(45) Date of Patent: *Jun. 24, 2014

(54) WRITE CLOCK PHASE TRACKING FOR MAGNETIC RECORDING DEVICE

(71) Applicant: Marvell International Ltd., Hamilton (BM)

(72) Inventors: Qiyue Zou, San Jose, CA (US); Supaket Katchmart, San Jose, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,800

(22) Filed: Aug. 9, 2013

Related U.S. Application Data

(63) Continuation of application No. 12/949,681, filed on Nov. 18, 2010, now Pat. No. 8,508,878.

(60) Provisional application No. 61/297,228, filed on Jan. 21, 2010, provisional application No. 61/303,226, filed on Feb. 10, 2010.

(51) Int. Cl.
*G11B 5/09* (2006.01)

(52) U.S. Cl.
USPC .......................................................... 360/51

(58) Field of Classification Search
None
See application file for complete search history.

(56) References Cited

U.S. PATENT DOCUMENTS

| | | |
|---|---|---|
| 5,535,067 A | 7/1996 | Rooke |
| 5,706,260 A | 1/1998 | Kishi et al. |
| 5,905,705 A | 5/1999 | Takeda et al. |
| 6,222,692 B1 | 4/2001 | Shrinkle |
| 6,529,456 B2 | 3/2003 | Koudo et al. |
| 6,643,082 B1 | 11/2003 | Belser |
| 7,088,534 B2 | 8/2006 | Sutardja |
| 7,092,462 B2 | 8/2006 | Annampedu et al. |
| 7,400,464 B1 | 7/2008 | Katchmart |
| 8,331,050 B1 | 12/2012 | Zou et al. |
| 8,508,878 B1 * | 8/2013 | Zou et al. .................. 360/51 |

(Continued)

FOREIGN PATENT DOCUMENTS

EP 56236 B1 5/1986

OTHER PUBLICATIONS

"Density Multiplication and Improved Lithography by Directed Block Copolymer Assembly for Patterned Media at 1Tbit/ in2 and Beyond"; Aug. 2008; pp. 1-3; Hitachi Global Storage Technologies; San Jose, CA., 3 pages.

(Continued)

*Primary Examiner* — Regina N Holder

(57) ABSTRACT

Synchronization technologies for disk drives are described. A described technique includes receiving a waveform produced by a read head operated with respect to a recording medium including magnetic data positions, a first servo sync mark (SSM), a second SSM, and phase tracking fields (PTFs); producing, based on the waveform, a servo detect pulse that indicates a detection of at least one of the SSMs; controlling a first adjustment of a phase of a write clock signal, the first adjustment being responsive to the servo detect pulse; producing, based on the write clock signal, samples of the waveform that correspond to the PTFs; and controlling second adjustments of the phase based on the samples to align the write clock signal with at least a portion of the data positions, the second adjustments being responsive to the PTFs, respectively.

20 Claims, 10 Drawing Sheets

(56) References Cited

U.S. PATENT DOCUMENTS

| | | |
|---|---|---|
| 8,508,879 B1 | 8/2013 | Zou et al. |
| 2004/0047252 A1 | 3/2004 | Miyatake et al. |
| 2006/0132953 A1 | 6/2006 | Asakura et al. |
| 2009/0237829 A1 | 9/2009 | Ozawa et al. |
| 2010/0053814 A1 | 3/2010 | Shibano |
| 2010/0073801 A1 | 3/2010 | Itakura |
| 2010/0118426 A1 | 5/2010 | Vikramaditya et al. |
| 2010/0123973 A1 | 5/2010 | Ozawa et al. |
| 2010/0142078 A1 | 6/2010 | Annampedu et al. |
| 2010/0202079 A1 | 8/2010 | Buch et al. |
| 2010/0220409 A1 | 9/2010 | Shibano |
| 2010/0246048 A1 | 9/2010 | Ranmuthu |

OTHER PUBLICATIONS

Qiyue Zou, "Sensor-Aided Patterned Magnetic Media Synchronization Systems", U.S. Appl. No. 13/007,787, filed Jan. 17, 2011, 54 pages.

* cited by examiner

WRITE CLOCK PHASE TRACKING FOR MAGNETIC RECORDING DEVICE

CROSS REFERENCE TO RELATED APPLICATIONS

This disclosure is a continuation application of and claims the benefit of the priority of U.S. patent application Ser. No. 12/949,681, filed Nov. 18, 2010, and entitled "Write Clock Phase Tracking For Magnetic Recording Device" (now U.S. Pat. No. 8,508,878), which claims the benefit of the priority of (i) U.S. Provisional Application Ser. No. 61/297,228, filed Jan. 21, 2010 and entitled "Phase Synchronization for Write Clock," and (ii) U.S. Provisional Application Ser. No. 61/303, 226, filed Feb. 10, 2010 and entitled "Bit Patterned Media Write Clock Phase Tracking." The disclosures of the above applications are incorporated herein by reference in their entirety.

BACKGROUND

Storage devices such as a magnetic medium based disk drive can store data on circular, concentric tracks on a disk surface. A magnetic medium based disk drive can include one or more bit-patterned media (BPM) based disks. BPM based disks have separately defined bit positions. In some implementations, a BPM based disk includes an ordered array of uniform magnetic islands where each bit occupies a single magnetic island.

A disk drive uses one or more clock signals for drive operations such as read and write operations. A drive head, in the disk drive, retrieves and records data on a rotating disk as the head flies on a cushion of air over the disk surface. When retrieving data, magnetic field variations are converted into an analog electrical signal, the analog signal is amplified, converted to a digital signal, and interpreted. A drive head can include a read head and a write head.

To guarantee the quality of the information saved on and read back from the disk, the drive head should be accurately positioned at the center of the track during both writing and reading, and the speed or frequency of read and write should be accurately controlled with respect to the rotating disk. A closed-loop control system can respond to servo information embedded in dedicated portions of a track on the recording surface to accurately position the head and synchronize the timing of drive operations.

SUMMARY

The present disclosure includes systems and techniques for operating a recording device, such as a disk drive.

According to an aspect of the present disclosure, a method for operating a recording device includes receiving a waveform produced by a read head operated with respect to a recording medium and a servo clock signal. A medium can include magnetic data bit cells, a first servo wedge, a second servo wedge, and phase tracking fields, where at least a portion of the phase tracking fields are arranged between the first servo wedge and the second servo wedge. The servo wedges can include respective servo sync marks. The method includes producing, based on the waveform, a servo detect pulse that indicates a detection of a servo sync mark. The method includes controlling a first adjustment of a phase of a write clock signal, the first adjustment being responsive to the servo detect pulse. The method includes producing, based on the write clock signal, samples of the waveform that correspond to phase tracking fields. The method includes controlling second adjustments of the phase based on the samples to align the write clock signal with at least a portion of the bit cells, the second adjustments being responsive to the phase tracking fields, respectively.

Implementations based on the method can include one or more of the following features. Implementations can include determining a phase of a read signal corresponding to a phase tracking field of the phase tracking fields. Implementations can include determining a phase offset based on the phase of the read signal and a target phase. An adjustment of the second adjustments can be based on the phase offset. The phase tracking fields can include two or more sets of a pattern. The pattern can include two magnetic strips having a first magnetic polarization and two magnetic strips having a second, different magnetic polarization. Controlling the first adjustment can include controlling an adjustment of the phase of the write clock signal based on a timing difference. The timing difference can be based on the servo detect pulse and a write pulse of the write clock signal. Implementations can include operating a counter to count clock pulses of the write clock signal. Implementations can include producing calibration pulses based on the counter reaching predetermined values, respectively. The circuitry to control the second adjustments can be responsive to the calibration pulses. Implementations can include controlling a write head to write to one or more of the bit cells based on the write clock signal. The read head can lead the write head with respect to the recording medium. In some implementations, the read head and the write head are positioned for different circumferences of the medium.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Systems and apparatuses can include circuitry configured to receive a waveform produced by a read head operated with respect to a recording medium and a servo clock signal, circuitry configured to produce, based on the waveform, a servo detect pulse that indicates a detection of a servo sync mark, circuitry configured to control a first adjustment of a phase of a write clock signal, where the first adjustment is responsive to the servo detect pulse, circuitry configured to produce, based on the write clock signal, samples of the waveform that correspond to phase tracking fields; and circuitry configured to control second adjustments of the phase of the write clock signal based on the samples to align the write clock signal with at least a portion of the bit cells, where the second adjustments are responsive to the phase tracking fields, respectively. These and other implementations can include one or more of the following features. Implementations can include circuitry configured to determine a phase of a read signal corresponding to a phase tracking field of the phase tracking fields. Implementations can include circuitry configured to determine a phase offset based on the phase of the read signal and a target phase. An adjustment of the second adjustments can be based on the phase offset. The phase tracking fields can include two or more sets of a pattern, where the pattern can include two magnetic strips having a first magnetic polarization and two magnetic strips having a second, different magnetic polarization. Implementations can include circuitry configured to control an adjustment of the phase of the write clock signal based on a timing difference. The timing difference can be based on the servo detect pulse and a write pulse of the write clock signal. Implementations can include circuitry configured to operate a counter to count clock pulses of the write clock signal. Implementations can include circuitry configured to produce calibration pulses based on the counter reaching predetermined values, respectively. The circuitry to control the second adjustments can be responsive to the calibration pulses. Implementations can include circuitry configured to control a write head to write to one or more of the bit cells based on the write clock signal. A read head can lead the write head with respect to the recording medium. In some implementations, the read head and the write head are positioned for different circumferences of the medium.

Systems and apparatuses can include clock circuitry configured to produce a write clock signal and a servo clock signal; a recording medium; a read head, operated with respect to the medium and the servo clock signal, to produce a waveform; circuitry configured to control a first adjustment of a phase of a write clock signal, where the first adjustment is responsive to the servo detect pulse; circuitry configured to produce, based on the write clock signal, samples of the waveform that correspond to the phase tracking fields; circuitry configured to control second adjustments of the phase of the write clock signal based on the samples to align the write clock signal with at least a portion of the bit cells, where the second adjustments are responsive to the phase tracking fields, respectively; and a write head, operated with respect to the medium and the write clock signal, to write data to the at least the portion of the bit cells. The medium can include magnetic data bit cells, a first servo wedge, a second servo wedge, and phase tracking fields, where at least a portion of the phase tracking fields are arranged between the first servo wedge and the second servo wedge. A servo wedge can include a servo sync mark.

These and other implementations can include one or more of the following features. Clock circuitry can include a first phase-locked-loop circuit, that includes a first voltage controlled oscillator, to produce the servo clock signal. Clock circuitry can include a second phase-locked-loop circuit, that includes a second voltage controlled oscillator, to produce the write clock signal. Clock circuitry can include a phase interpolator to adjust the phase of the write clock signal. Clock circuitry can be configured to use a single voltage controlled oscillator to produce the write clock signal and the servo clock signal. Clock circuitry can include a phase-locked-loop circuit, that includes the voltage controlled oscillator, to produce a source clock signal. Clock circuitry can include a frequency divider to produce a frequency adjusted version of the source clock signal.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
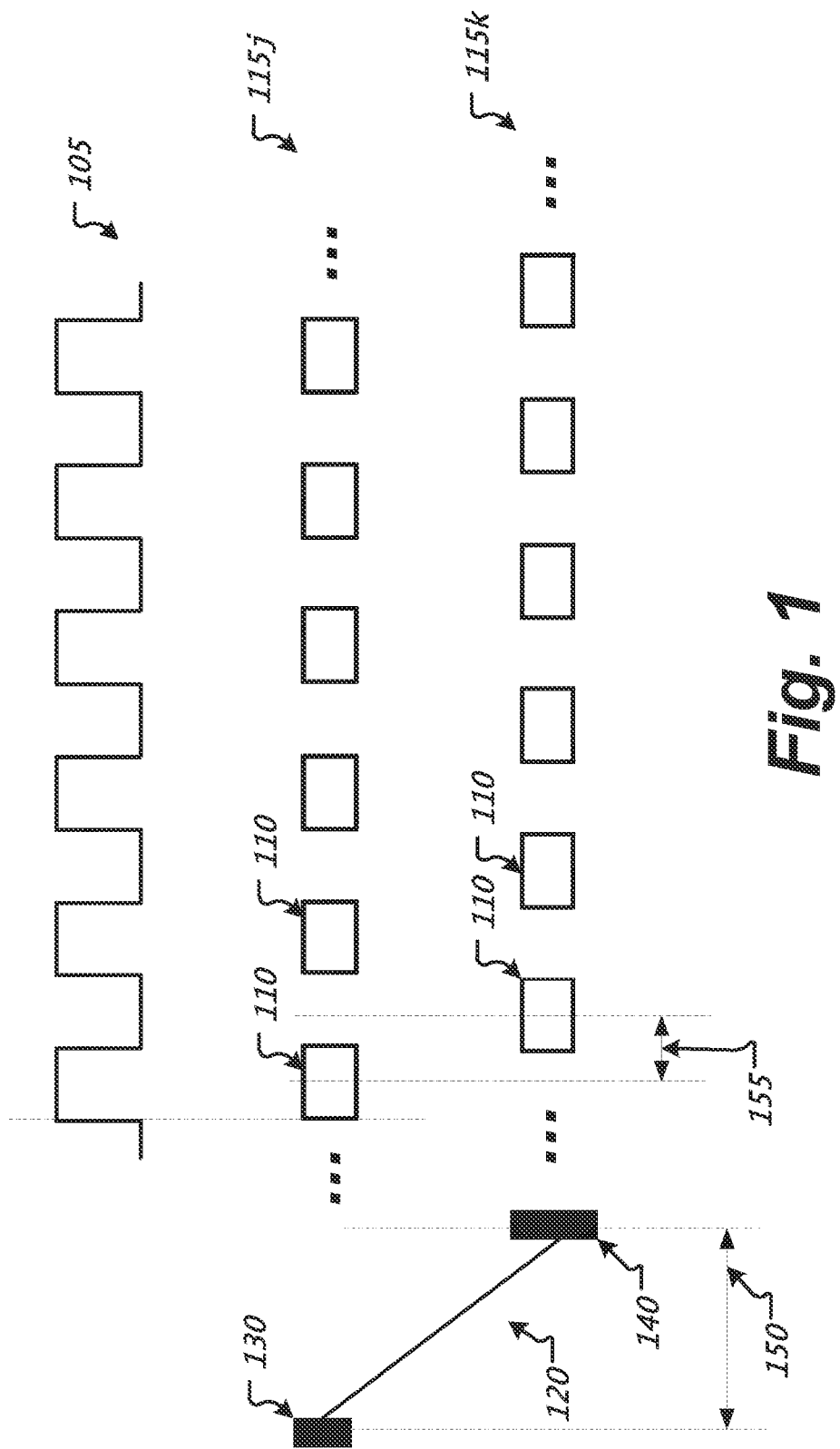
FIG. 1 shows an example of an alignment of clock signal pulses with bit cells on a bit-patterned medium.

Bit-patterned media (BPM) technologies can increase the capacity of magnetic storage to beyond 1 Tbit/in$^2$. In today's conventional continuous media, for example, recorded bits are composed of many independent nanometer-scale grains in a film of magnetic alloy. Increasing bit density for greater storage capacity may require increasingly smaller grain sizes. However, smaller grain sizes on a continuous media may increase superparamagnetic effects to the point where the effects become a major factor that prevents further increases of storage density.

In contrast to continuous media, BPM based disks have separately defined bit positions. For example, such disks can include an ordered array of uniform magnetic islands where each bit occupies a single magnetic island. Such a bit arrangement may achieve better thermal stability than continuous media. Because the position of each bit is predefined by the media, BPM technology may require greater write clock frequency and phase accuracy than continuous media. For example, loss in synchronization between the write clock pulses and the bit islands may cause significant errors that are difficult to detect and correct.

During operation, a disk drive may experience deterministic disturbances, non-deterministic disturbances, or both that impact drive synchronization. Deterministic disturbances such as repeatable run-out (RRO) errors and non-deterministic disturbances such as non-repeatable run-out (NRRO) errors can cause clock synchronization errors. Various examples of deterministic disturbances include disk eccentricity, servo RRO errors, and spindle commutation harmonics, e.g., harmonics of a spindle frequency. Sources of non-deterministic disturbances include phase noise and transient events such as a physical tap on a drive and fluctuations in power that alter a rate of rotation. In some cases, RRO errors are a dominate source of write clock timing errors. RRO errors typically cause the same timing error pattern each time a drive head passes over the same portion of the track, whereas, NRRO errors are generally random and causes different error patterns for the same portion of the track.

The subject matter described herein includes details and implementations of write clock synchronization technologies for recording media. Write clock synchronization technologies include a write clock synchronization technique to operate disk drives that employ high performance timing control for writing operations, such as BPM based disk drives. For example, a write clock synchronization technique includes sensing a bit pattern of a BPM disk to synchronize a write clock to write data to a region of the disk. The technique can use phase tracking fields to rephase the write clock to write to adjacent groups of bit cells, respectively, Potential advantages of the disk drive synchronization technologies include compensating for errors, such as deterministic disturbances, non-deterministic disturbances, or both, in an optimized manner to provide accurate synchronization for write operations.

In the absence of disturbances, a disk drive servo is expected to have a constant frequency offset. The rotational angular velocity can be based an absolute angle of the disk and can have the form $$\omega = \frac{\pi}{4 \times T}$$

where T represents the time required to rotate the disk by angle π/4. However, disk data eccentricity, e.g., misalignment of center of data track and center of disk rotation, may require different changes to the disk drive servo to compensate for different degrees of eccentricity. In one portion of a track, data track angular velocity can have the form $$\omega_d = \frac{\pi + \theta}{4 \times T}$$

and in a different portion of the track, data track angular velocity can have the form $$\omega_d = \frac{\pi - \theta}{4 \times T}$$

where θ represents an angular difference of a disk rotational center and a data track center. Left uncompensated, these different angular velocities create a repetitive frequency shift in a read head signal. A frequency shift can be determined by measuring a duration during which a read head passes over consecutive servo sync marks on a disk with respect to a clock signal. A disk drive can adjust a sampling clock signal to match with a determined frequency shift, thus matching with a disk angular velocity at that particular rotational angle.

FIG. 1 shows an example of an alignment of clock signal pulses with bit cells on a bit-patterned medium. A disk drive system can use a write clock signal 105 to control a write operation on a BPM disk. A BPM disk includes multiple bit islands called bit cells 110 that are arranged on two or more tracks 115j, 115k. For example, a bit-patterned medium can have an arrangement of bits cells 110 that forms concentric tracks about a center of the medium. The disk drive system can include a head structure 120 that is positioned by a servo. The head structure 120 includes a write head 130 and a read head 140. In this example, the write head 130 and the read head 140 are physically offset such that the read head 140 reads data such as servo information on a first track 115k and the write head 130 writes data to a second track 115j. Reading servo information can include reading a portion of a servo wedge.

The write clock signal 105 is synchronized based on servo information detected on a first track 115k via the read head 140 before writing data to a second track 115j. Based on the detected servo information, disk geometry, and head structure geometry, the disk drive system can adjust the write clock signal 105 such that a rising edge of a write clock pulse aligns with an edge of a bit cell 110 on track 115k. Various examples of disk geometry and head structure geometry information include a head offset value 150 and an inter-track phase offset value 155. A head offset value 150 is based on a distance between a read head and a write head. An inter-track phase offset value 155 represents a difference in phase between the first track 115k and the second track 115j.

In some implementations, a disk drive system, in performing a clock synchronization, can process a waveform produced by a read head operated with respect to a BPM disk to sense bit patterns on the disk. The timing information provided by the waveform can be used to synchronize a write clock 105 with the disk. For example, an interpolator can be used to adjust the phase of the write clock 105 to synchronize the write clock 105 based on the detection of a servo sync mark in a read head signal. Based on the timing information, the disk drive system can set a phase for the write clock 105 via a phase interpolator. The phase shift can be determined by the disk drive system for one or more tracks 115j, 115k. Once synchronized, the write clock 105 becomes in phase with one or more bit cells 110.

Figure 2:
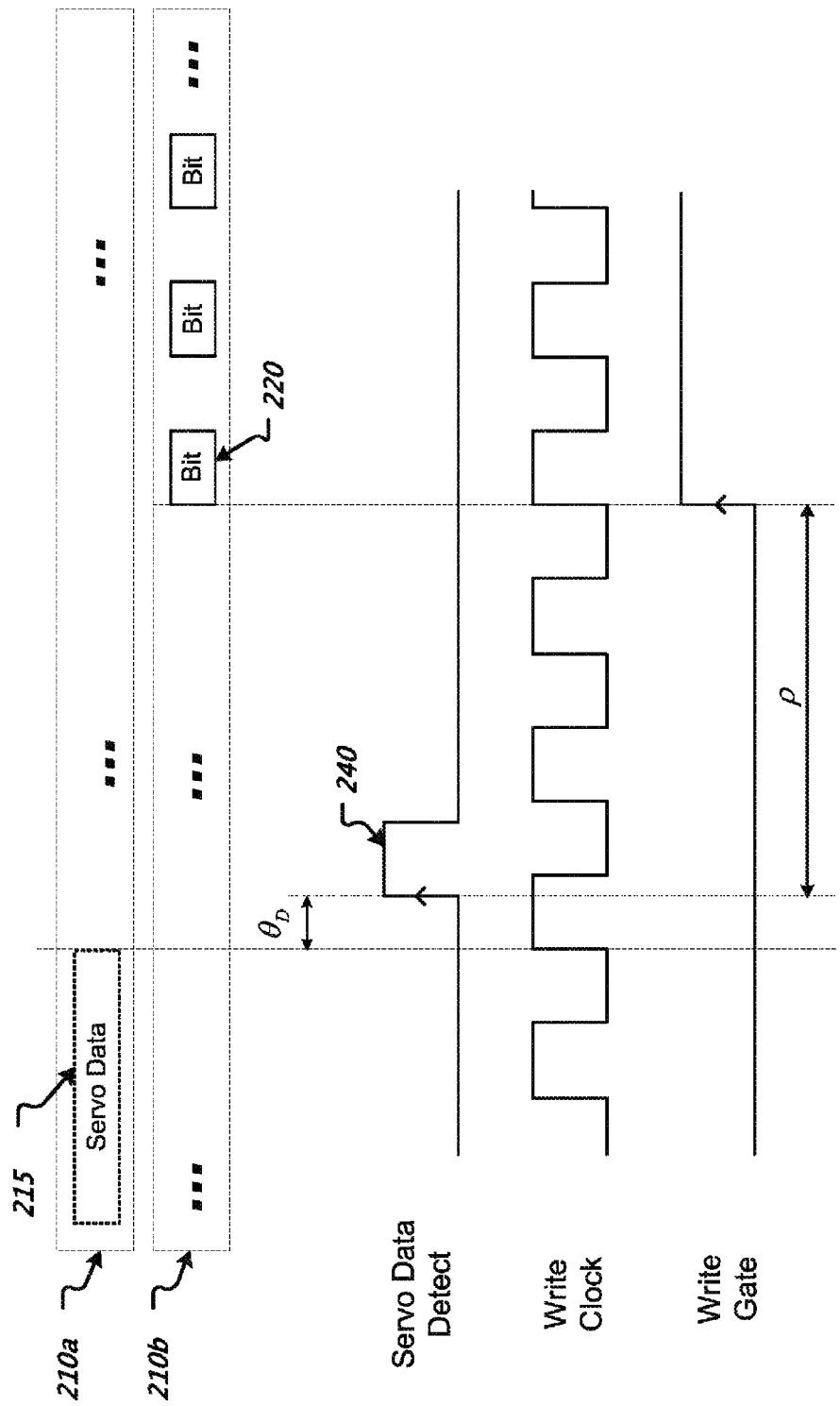
FIG. 2 shows an example of write timing synchronization with respect to bit cells of a bit-patterned medium.

FIG. 2 shows an example of write timing synchronization with respect to bit cells of a bit-patterned medium. A disk drive system, which can include a servo controller, can synchronize the timing of writes to bits cells of a RPM based disk. The servo controller reads servo data 215, such as a servo sync mark, on a track 210a of a BPM disk via a read head. To indicate the detection of a servo synchronization mark in servo data 215, the controller produces a detection pulse 240 (e.g., a sync mark found pulse) on a servo data detect line. Timestamp circuitry generates a timestamp of the detection pulse 240 with respect to the write clock. Based on the generated timestamp, the controller performs a synchronization process for related control signals such as adjusting a phase of a write clock, write gate timing, or both.

After performing a synchronization based on the detection of servo data 215, the controller can perform a write operation on one or more bit cells 220 of a target track 210b. Writing to the target track 210b can commence based on signaling of a write gate line. Performing a synchronization can include determining when to generate a signal on the write gate line with respect to the detection pulse 240. Writes to individual bit cells 220 of the target track 210b are aligned with respective pulses on a write clock line. The controller can perform additional synchronizations to write to other groups of bit cells located at different data wedges of the target track 210b based on respective detections of additional servo sync marks on a different track 210a.

Performing synchronization can include adjusting a phase of a write clock based on information including a write phase offset ρ, conveying the phase offset based on the rising edge of a detection pulse 240 and the rising edge of a write clock for a data bit 220 following a servo wedge. The write phase offset can be fractional. The write phase offset can be calibrated by a controller during a drive manufacturing process and stored on chip memory. The write phase offset can be measured in clock cycles.

Determining a write phase offset can include using an initial offset, writing a predetermined sequence to a track based on the initial offset, determining an error value based on a read-back version of the sequence, and adjusting the initial offset if required. In some implementations, determining a write phase offset includes iterating through multiple offset values, writing a predetermined sequence to a track based on an offset value of a given iteration, reading back information, and recording a corresponding bit error rate (BER). Determining a write phase offset can include selecting an offset value that corresponds to the lowest recorded BER. In some cases, a band of write phase offset values exist that result in minimum BER, and one of the values cane be selected.

A phase delay value $\theta_D$ indicates a phase offset based on the rising edge of the detection pulse 240 and the rising edge of a write clock pulse. In some implementations, a delay value is computed by timestamp circuitry based on a predetermined resolution. The value of $\theta_D$ can be zero if a servo clock is the same as a write clock. However, the servo clock and the write clock can be asynchronous. Based on $\theta_D$ and $\rho$, a disk drive can adjust the phase of the write clock to synchronize the write clock with the media.

Figure 3:
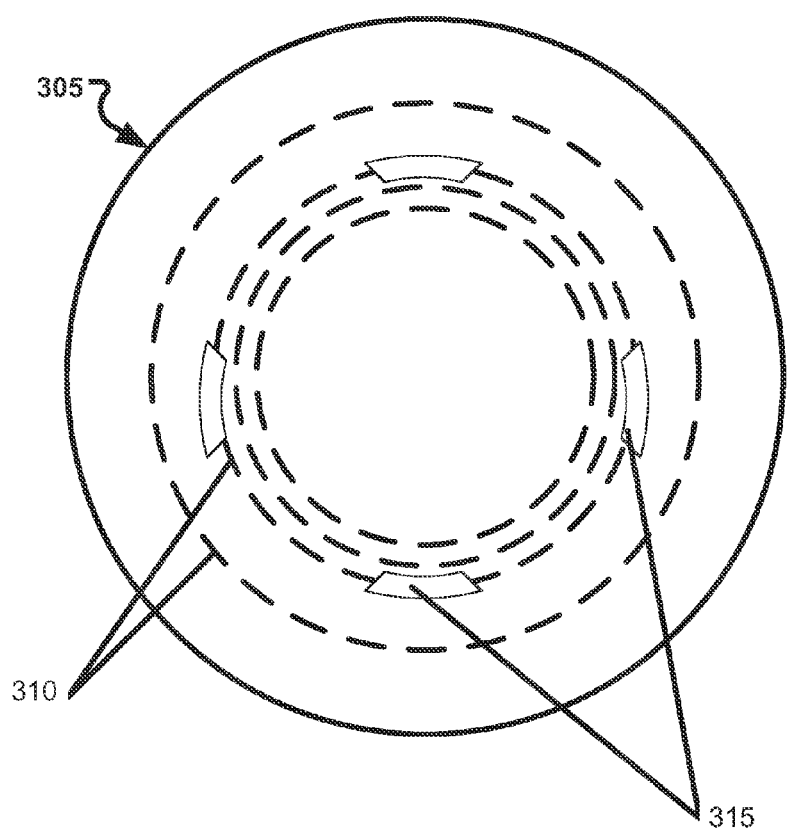
FIG. 3 shows an example of a surface of a recording medium that includes servo wedges.

FIG. 3 shows an example of a surface of a recording medium that includes servo wedges. A recording medium 305 includes multiple data tracks 310 and servo wedges 315. A servo wedge 315 includes servo data designed to provide accurate read/write head positioning with respect to data tracks. For sake of brevity and simplicity, FIG. 3 only shows four servo wedges 315 on one data track 310. However, a recording medium 305 can include significantly more servo wedges 315 (e.g., hundreds of servo wedges) on multiple data tracks 310. Note that other embodiments of servo wedges 315 than those depicted by FIG. 3 and described herein are possible.

The data tracks 310 are concentrically located areas defining tracks associated with different radii on a surface of the recording medium 305. In some implementations, data tracks 310 are divided into multiple data sectors and formatted in radial zones. Radial zones radiating outwardly from the inner diameter (ID) to the outer diameter (OD) can be written at progressively increased data frequencies to take advantage of an increase in linear velocity of the medium surface in the respective radial zones. A data track 310 can include bit cells between servo wedges 315. In some implementations, the bit cells are fabricated by a lithographic manufacturing process.

Servo wedges 315 can be equally spaced about a circumference of the surface of the recording medium 305. A servo wedge 315 can include servo patterns written thereon. For example, each servo wedge 315 can include data and supporting bit patterns that can be used for control and synchronization of a drive head over a desired storage location on a recording medium 305. A servo wedge 315 can include information such as a servo wedge index and a track number. A disk control system can use the servo wedges 315 to control a rotational speed of the recording medium 305.

In some implementations, at least a portion of a servo wedge 315 is etched on a surface of the recording medium 305. In some implementations, a servo wedge 315 includes one or more strips of magnetic material that extend radially from the ID to the OD of the recording medium 305. For example, a servo wedge 315 can span two or more data tracks 310. In some implementations, a servo wedge 315 includes islands of magnetic material in an arrangement useful for servo control. For example, a portion of a servo wedge 315 is encoded by one or more bit cells.

A servo pattern contained in a servo wedge 315 can be read by the drive head as the surface of the recording medium 305 passes under a drive head. Servo patterns written in the servo wedges 315 can provide a disk control system with head position control information to control an actuator arm when moving a drive head from starting tracks to destination tracks during random access track seeking operations. The servo patterns can provide a disk control system with head position control information to control an actuator arm when positioning and maintaining a drive head in proper alignment with a track during track following operations when data are read from or written to data sectors on the data tracks 310.

In some implementations, before performing a read/write operation on a section of a data track 310, a drive head can lock onto a desired track by referring to the positioning information retrieved using the servo patterns in a given servo wedge 315. The servo wedges 315 can provide the positioning information necessary to control a spindle motor rotating the recording medium 305 and to position a drive head to read and write data at the correct locations on the recording medium 305.

A servo wedge 315 can include a preamble (e.g., used for locking the phase and frequency of a servo timing loop clock to a given servo pattern), a servo sync mark (SSM) (e.g., used to lock to the media and generate the servo detection pulse), and location information such as a track identification field and data block address (e.g., used for identifying a target track and data block). In some implementations, a SSM includes a Servo Index Mark (SIM), Servo Address Mark (SAM), or both. In some implementations, a BPM disk can include servo wedges with phase synchronization marks. A disk drive process can include reading the phase synchronization marks, demodulating angle information, and re-phasing a write clock accordingly.

A disk drive can use servo sync marks to compensate for phase errors of a write clock signal with respective to bit islands. However, phase errors may increase when moving from one servo to the next. A disk can include phase tracking fields situated between servo sync marks to provide reference points for frequent phase error corrections.

Figure 4:
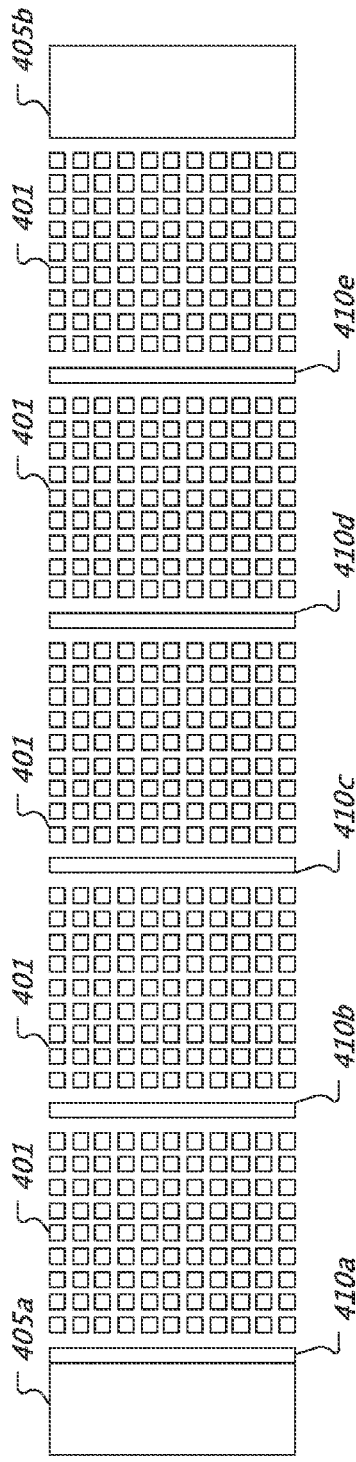
FIG. 4 shows a layout example of servo wedges, phase tracking fields, and bit cells.

FIG. 4 shows a layout example of servo wedges, phase tracking fields, and bit cells. The shown portion of a bit-pattern medium includes servo wedges 405*a*, 405*b*; phase tracking fields 410*a*, 410*b*, 410*c*, 410*d*, 410*e*; and bit cells 401. The phase tracking fields 410*a-e* are arranged between a first servo wedge 405*a* and a second servo wedge 405*b*. A phase tracking field 410*a-e* delineates a start of one or more track segments, each containing a row of data bit cells 401. In some implementations, a phase tracking field 410*a* immediately follows a servo wedge 405*a*. For example, a disk drive uses the servo wedge 405*a* to make a coarse adjustment to the phase of the write clock and then uses the adjacent phase tracking field 410*a* to make a fine adjustment to the phase. The phase tracking fields 410*a-e* can extend radially from an ID to an OD of a recording medium for one or more tracks. The number of phase tracking fields 410*a-e* for a track can increase as the density of bit cells 401 increased. For example, when compared to shorter tracks, longer tracks can include more phase tracking fields. However, as depicted by FIG. 4, a group of consecutive tracks, while residing on different disk circumferences, can be manufactured to have the same density of bit cells 401.

The bit-pattern medium can include phase tracking fields 410*a-e* placed at intervals of N data bit cells 401. In some implementations, N is based on a tolerance limit for phase error and accuracy of phase error correction and can be represented by:

$$N = \frac{PE_{max}}{2 \times FE_{max}}$$

where $FE_{max}$ is a maximum frequency error and $PE_{max}$ is a maximum phase error that are allowed in the system. For example, for a $FE_{max}$ of 10 ppm and a $PE_{max}$ of +/−10%, N equals 5,000 bits.

Figure 5:
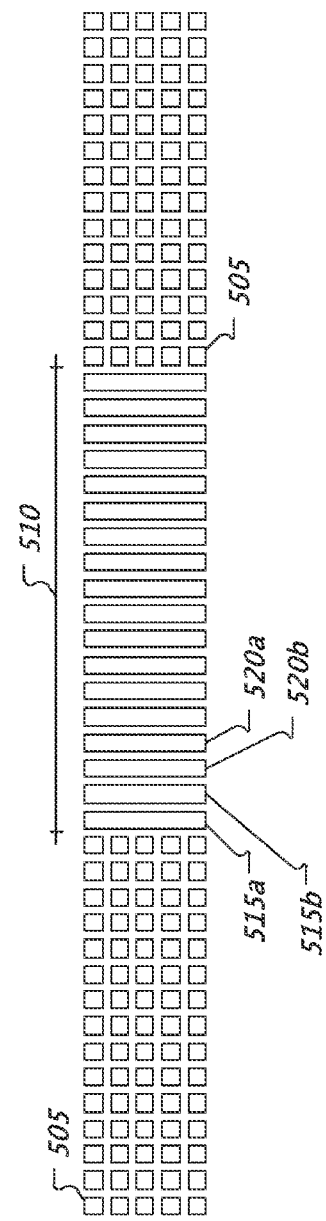
FIG. 5 shows a layout example of a phase tracking field.

FIG. 5 shows a layout example of a phase tracking field. A phase tracking field 510 can be used to calibrate a phase of a write clock for writing to bit cells 505. A phase tracking field 510 can provide phase tracking for two or more tracks of bit cells 505. In some contexts, a phase tracking field (PTF) is referred to as a write calibration wedge. The phase tracking field 510 includes a 2 T pattern. For example, the phase tracking field 510 includes first strips 515a, 515b of magnetic material that neighbor second strips 520a, 520b of magnetic material that have a different magnetic polarization. The phase tracking field 510 can include two or more groups of first strips 515a, 515b that are interleaved with two or more groups of second strips 520a, 520b. The 2 T pattern can be repeated based on an amount of system noise. In some implementations, a bit pitch of each strip 515a, 515b, 520a, 520b in the phase tracking field 510 is the same as a bit pitch of a data bit cell 505. Other patterns for a phase tracking field are possible.

Figure 6:
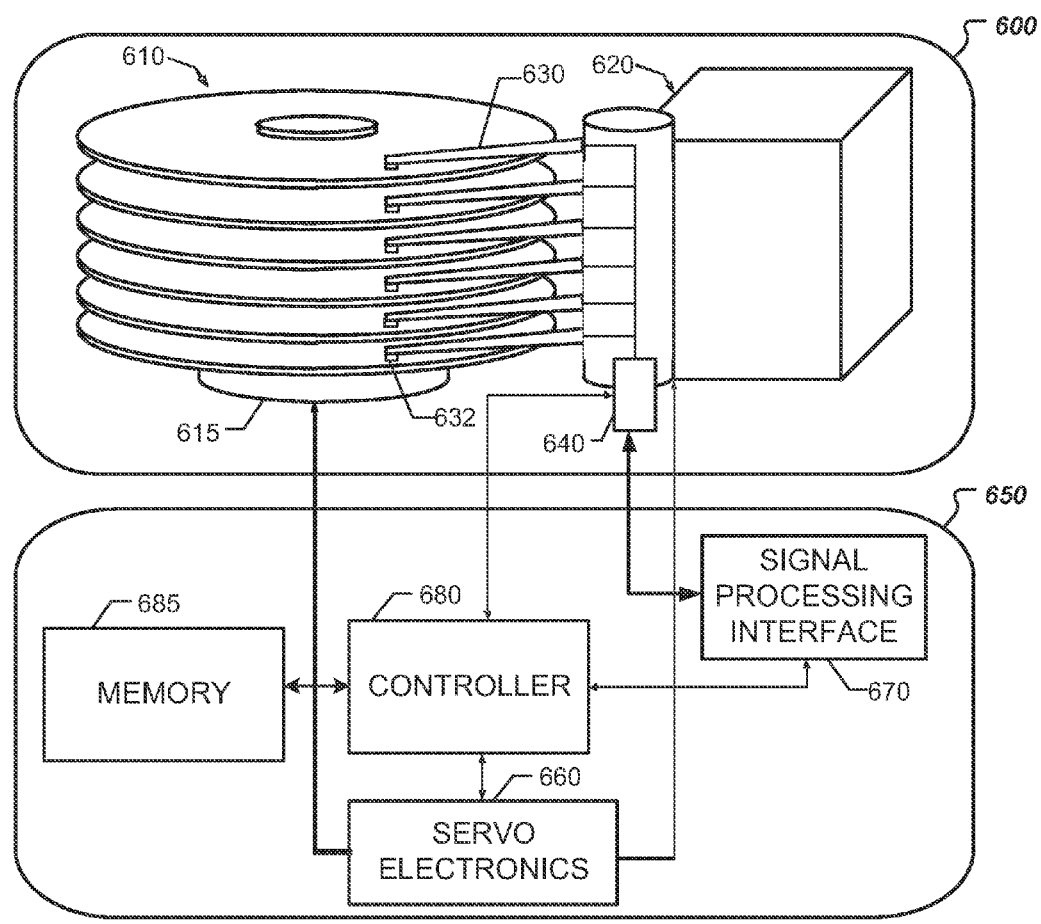
FIG. 6 shows an example of a disk drive system.

FIG. 6 shows an example of a disk drive system. The disk drive includes a head-disk assembly (HDA) 600 and drive electronics 650 (e.g., a printed circuit board assembly (PCBA) with semiconductor devices). The disk drive can include a magnetic recording medium such as one or more BPM based disks 610. A disk 610 can be coated with a magnetically hard material (e.g., a particulate surface or a thin-film surface) and can be written to, or read from, a single side or both sides of each disk. A disk 610 can be coated with a magnetic material with predefined bit positions, e.g., bit cells, to form bit-patterns. In some implementations, a disk 610 can be manufactured to have a configuration such as the one depicted by FIG. 4.

The HDA 600 includes one or more disks 610 mounted on an integrated spindle and motor assembly 615. The integrated spindle and motor assembly 615 includes a spindle motor to rotate the disks 610. The spindle and motor assembly 615 rotates the disk(s) 610 under one or more drive heads 632 that are mechanically coupled with a head assembly 620 in the HDA 600. A drive head 632 can include one or more magnetic transducers. In some implementations, a drive head 632 includes a read head and a write head. The read head and the write head can form separate portions of the drive head 632. For example, the read head can be physically offset from the write head.

A drive head 632 on an arm 630 can be positioned as needed to read or write data on the disk 610. A motor, such as a voice coil motor (VCM), can be used to position the drive head 632 over a target track on a disk 610. The arm 630 can be a pivoting or sliding arm and can be spring-loaded to maintain a proper flying height for the drive head 632 in any drive orientation. The HDA 600 can include a preamp/writer 640, where head selection and sense current value(s) can be set. The preamp/writer 640 can amplify a read signal before outputting it to signal processing interface 670. Signals between the HDA 600 and drive electronics 650 can be carried through a flexible printed cable.

Drive electronics 650 can include servo electronics 660, signal processing interface 670, and controller 680. The signal processing interface 670 can include a read signal circuit, a servo signal processing circuit, and a write signal circuit. Controller 680 can include processor electronics such as one or more processors to operate the disk drive. The controller 680 can be configured to perform one or more techniques described herein. A controller 680 can communicate with a memory 685 such as a non-volatile memory to retrieve firmware to operate processor electronics. The memory 685 can store data such as synchronization parameters estimated by a technique described herein. In some implementations, controller 680 includes a storage area for computer program code and data.

The controller 680 can be communicatively coupled with an external processor or data bus to receive read/write instructions, receive data to write to disk(s) 610, and transmit data read from one or more disks 610. Controller 680 can direct servo electronics 660 to control mechanical operations, such as head positioning through the head assembly 620 and rotational speed control through the motor assembly 615. In some implementations, the controller 680 can be integrated with the servo electronics 660, signal processing interface 670, or both. The controller 680 can be implemented as one or more integrated circuits (ICs). Drive electronics 650 can also include one or more interfaces, such as a host-bus interface, and memory devices, such as a read only memory (ROM) for use by a microprocessor, and a random access memory (RAM) for use by a hard disk drive controller.

Disk(s) 610 are written with servo information such as servo wedges to aid the controller 680 in adjusting the position of the drive head 632 with respect to a track on the disk(s) 610 and to control the spindle and motor assembly 615. Servo wedge information read by a drive head 632 can be converted from analog signals to digital data by a digital-analog converter, and fed into servo electronics 660. The servo positional information can be used to detect the location of the drive head in relation to a target track or target data sector on a disk 610. Servo electronics 660 can use, for example, target data sectors and servo position information to precisely place a drive head 632 over the target track and data sector on a disk 610, and to continuously maintain head alignment with the target track while writing or reading data to or from one or more identified data sectors.

Drive electronics 650 can include a write phase tracking and control system. Such a system can include phase offset calculators for adjusting a phase of the write clock based on SSM and PTFs, respectively. In some implementations, the controller 680 implements a phase offset calculator.

Drive electronics 650 can include clock circuitry that contains a single voltage-controlled oscillator (VCO) to drive a servo clock and a write clock. A servo clock and a write clock can have different frequency requirements. To produce signals with different frequency requirements, clock circuitry can include a frequency divider to divide the frequency of a signal generated by a single VCO to produce a frequency adjust version of the VCO output signal. In some implementations, clock circuitry includes first and second VCOs, in separate phase-locked-loops, to drive a servo clock and a write clock, respectively.

Figure 7:
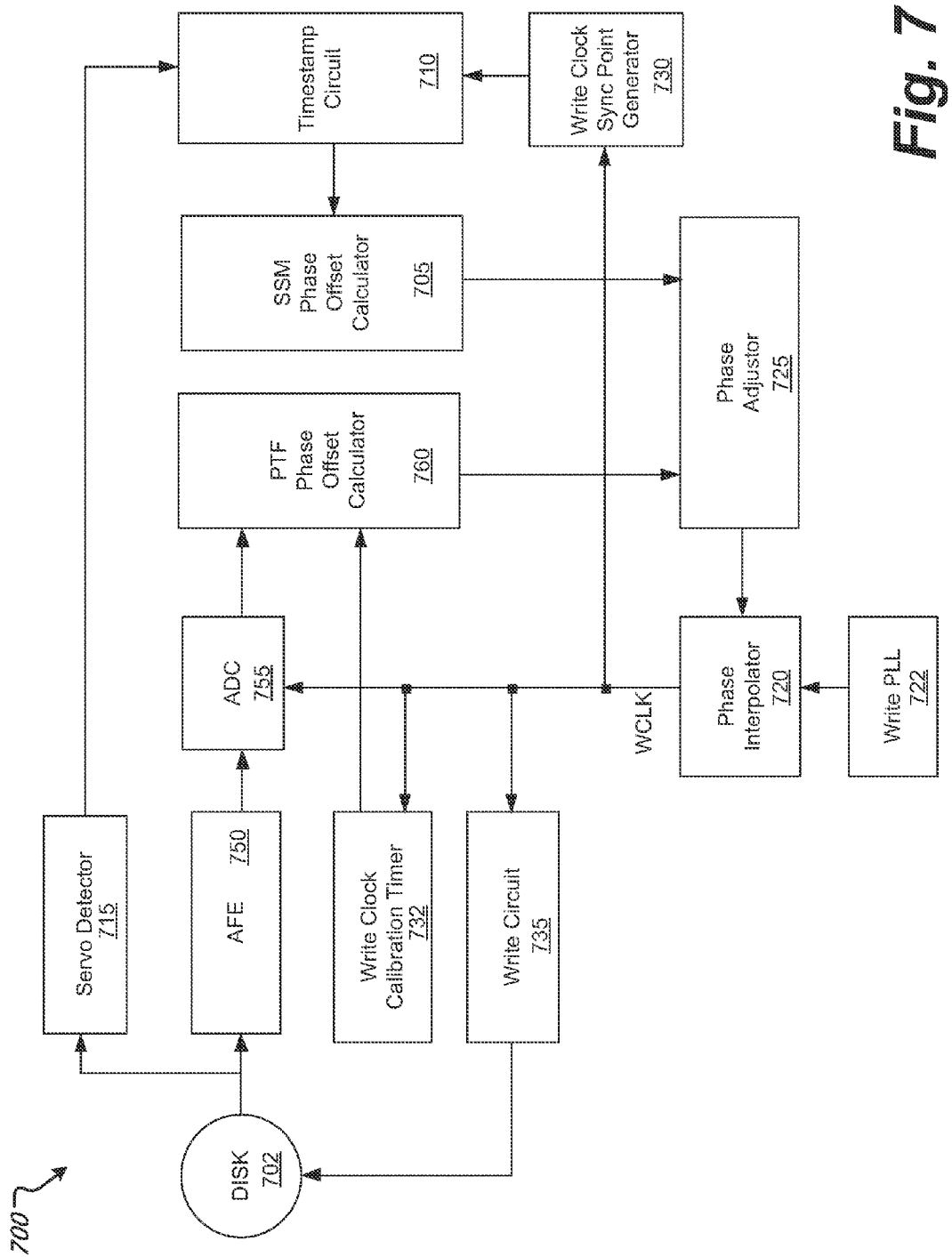
FIG. 7 shows an example of a write phase tracking and control system architecture.

FIG. 7 shows an example of a write phase tracking and control system architecture. A disk drive can include a write phase tracking and control system 700 for synchronization of a write clock (WCLK) for one or more drive operations on a BPM disk 702. The write clock can be produced via a phase interpolator 720 and a write phase-locked-loop (PLL) 722. The system 700 includes phase offset calculators 705, 760 for adjusting a phase of the write clock. In this example, the system 700 includes a SSM phase offset calculator 705 and a PTF phase offset calculator 760. A phase adjustor 725 generates a signal to control the phase interpolator 720 based on phase offset values determined by the phase offset calculators 705, 760.

The SSM phase offset calculator 705 determines a phase offset value based on a servo detection pulse timestamp and a write clock sync pulse timestamp. In some implementations, a phase adjustor 725 uses the determined phase offset value to change a write phase input of the phase interpolator 720. A servo detector 715 can produce a servo detection pulse to indicate a detection of a SSM based on a read head's passage over a SSM on the BPM disk 702. A write dock sync point generator 730 can produce a write clock sync pulse based on a roll over of a counter incremented by pulses of the write clock. A timestamp circuit 710 can provide timestamps of the servo detection pulse and the write clock sync pulse, respectively.

The PTF phase offset calculator 760 determines a phase offset value based on detected PTFs. A read head can produce a waveform that is processed by an analog front-end (AFE) 750. An analog-to-digital convertor (ADC) 755 generates samples of a signal produced by the AFE 750. The ADC 755 can be responsive to one or more clock signals. In this example, the ADC 755 is responsive to the write clock to generate samples for the PTF phase offset calculator 760. A write clock calibration timer 732 produces a calibration control signal, e.g., a calibration pulse, based on a calibration timer. The production of a calibration control signal can correspond to a duration of the read head waveform that should contain PTF data. The calibration control signal causes the PTF phase offset calculator 760 to process samples from the ADC 755. In some contexts, these samples are referred to as PTF samples.

The phase adjustor 725 can receive PTF phase offset values from the PTF phase offset calculator 760 and SSM phase offset values the SSM phase offset calculator 705. After receiving a SSM phase offset value, the phase adjustor 725 successively receives two or more PTF phase offset values that correspond to two or more PTFs on the BPM disk 702. The phase adjustor 725 applies a phase control signal to the phase interpolator 720 based on the received SSM phase offset value. The phase adjustor 725 then successively applies, based on the successively received PTF phase offset values, phase control signals to successively update the phase of the write clock. Following a phase update based on a PTF, the write circuit 735 uses the write clock to write to bit cells of the disk 702 that follow the PTF.

Figure 8:
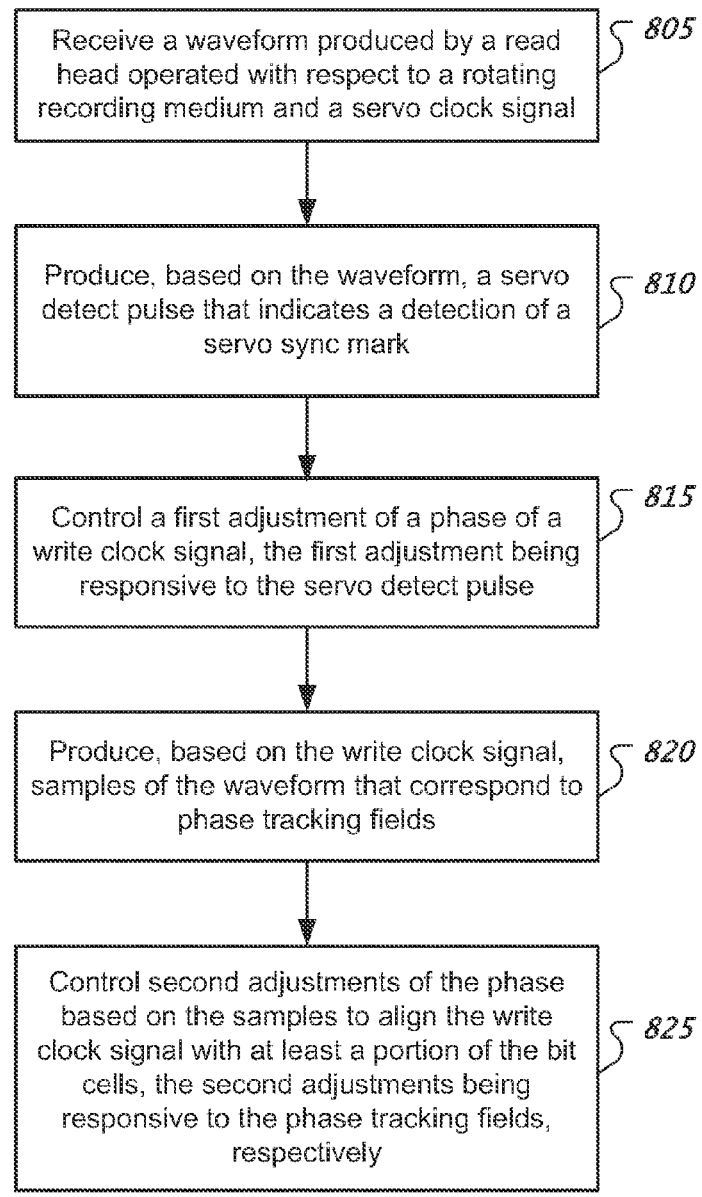
FIG. 8 shows an example of a synchronization process.

FIG. 8 shows an example of a synchronization process. A disk drive can synchronize a write clock for writing to a BPM based disk. The disk drive can synchronize the write clock for each data sector to provide the timing synchronization required for that data sector. Further, the disk drive can rephase the write clock based on one or more phase tracking fields. At 805, a synchronization process includes receiving a waveform produced by a read head operated with respect to a rotating recording medium and a servo clock signal. Receiving a waveform can include receiving a digital version of the waveform. At 810, the synchronization process includes producing, based on the waveform, a servo detect pulse that indicates a detection of a SSM. The synchronization process can detect a SSM by matching a portion of the waveform with a known media pattern.

At 815, the synchronization process includes controlling a first adjustment of a phase of a write clock signal. The first adjustment is responsive to the servo detect pulse. In some implementations, the process includes measuring a timing difference that is based on the servo detect pulse and a write pulse of the write clock signal. Measuring a timing difference can include using a timestamp corresponding to the servo detect pulse and a timestamp corresponding to the write pulse. Controlling an adjustment of a phase of the write clock signal can include providing a phase interpolator with a phase value that is based on the timing difference.

At 820, the synchronization process includes producing, based on the write clock signal, samples of the waveform that correspond to phase tracking fields. In some implementations, an ADC can use a write clock as a timing input to produce the samples. In some implementations, the ADC uses a multiplexer to switch between the read clock and the write clock.

At 825, the synchronization process includes controlling second adjustments of the phase based on the samples to align the write clock signal with at least a portion of the bit cells. The second adjustments are responsive to the phase tracking fields, respectively. The synchronization process can operate a phase detection circuit that includes a Coordinate Rotation Digital Computer (CORDIC) to determine a phase of a calibration signal, e.g., a read head signal corresponding to a PTF. In some implementations, a phase detection circuit performs a table lookup to determine a phase of a calibration signal. The phase is compared with an expected target value, and the difference is referred to as a write phase error. The write clock signal can be adjusted by the write phase error. After a PTF phase offset adjustment, a disk drive can write to one or more bit cells that follow a PTF.

In some implementations, the synchronization process operates a servo clock that is locked on to servo data of a first track. Based on a detection of servo data on the first track, a disk drive can synchronize a write clock to the servo clock to write data to the second track. In some implementations, the synchronization process reads servo data from a track, synchronizes based on the servo data, and writes to the same track.

Figure 9:
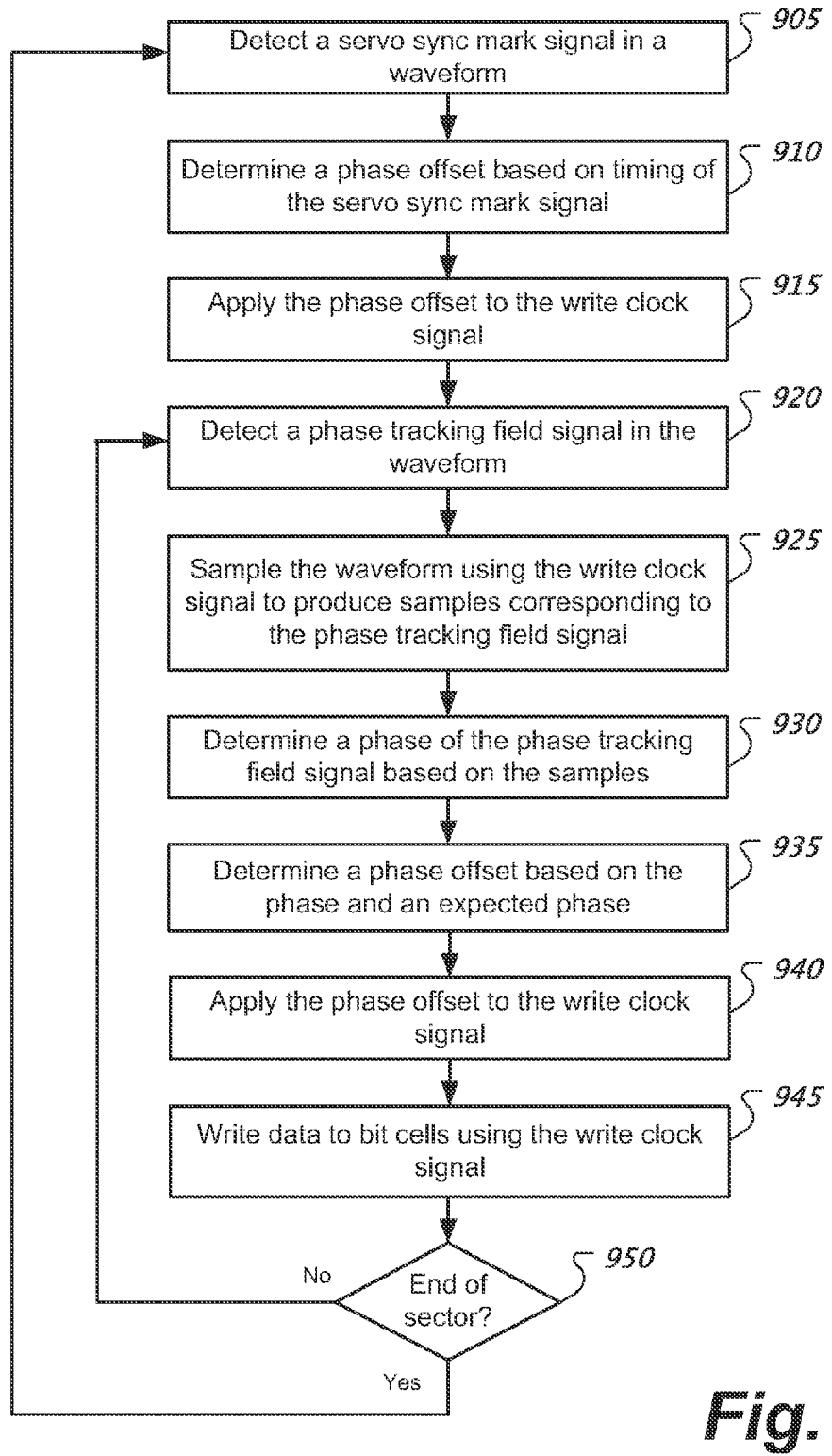
FIG. 9 shows another example of a synchronization process.

FIG. 9 shows another example of a synchronization process. At 905, the synchronization process detects a servo sync mark signal in a waveform. At 910, the process determines a phase offset based on timing of the servo sync mark signal. Determining a phase offset can include using a timestamp of the servo sync mark and a timestamp of a write clock pulse. At 915, the process applies the phase offset to the write clock signal.

At 920, the synchronization process detects a phase tracking field signal in the waveform. Detecting a phase tracking field signal can be initiated by a write clock calibration signal. Timing of the write clock calibration signal is based on one or more characteristics of the disk drive such as rotational speed, spacing of the PTFs, and length of the PTFs. At 925, the process samples the waveform using the write clock signal to produce samples corresponding to the phase tracking field signal.

At 930, the process determines a phase of the phase tracking field signal based on the samples. Determining a phase can include determining an angular offset. At 935, the process determines a phase offset based on the phase and an expected phase. At 940, the process applies the phase offset to the write clock signal. At 945, the process writes data to bit cells using the write clock signal. At 950, the process determines whether the end of a sector has been reached. Determining whether the end of the sector can include detecting a servo wedge. If a start of a servo wedge has not been detected, the process can, at 920 detect the next phase tracking field signal in the waveform. If the start of a servo wedge has been detected, the process, at 920 detects a servo sync mark signal in the waveform.

Figure 10:
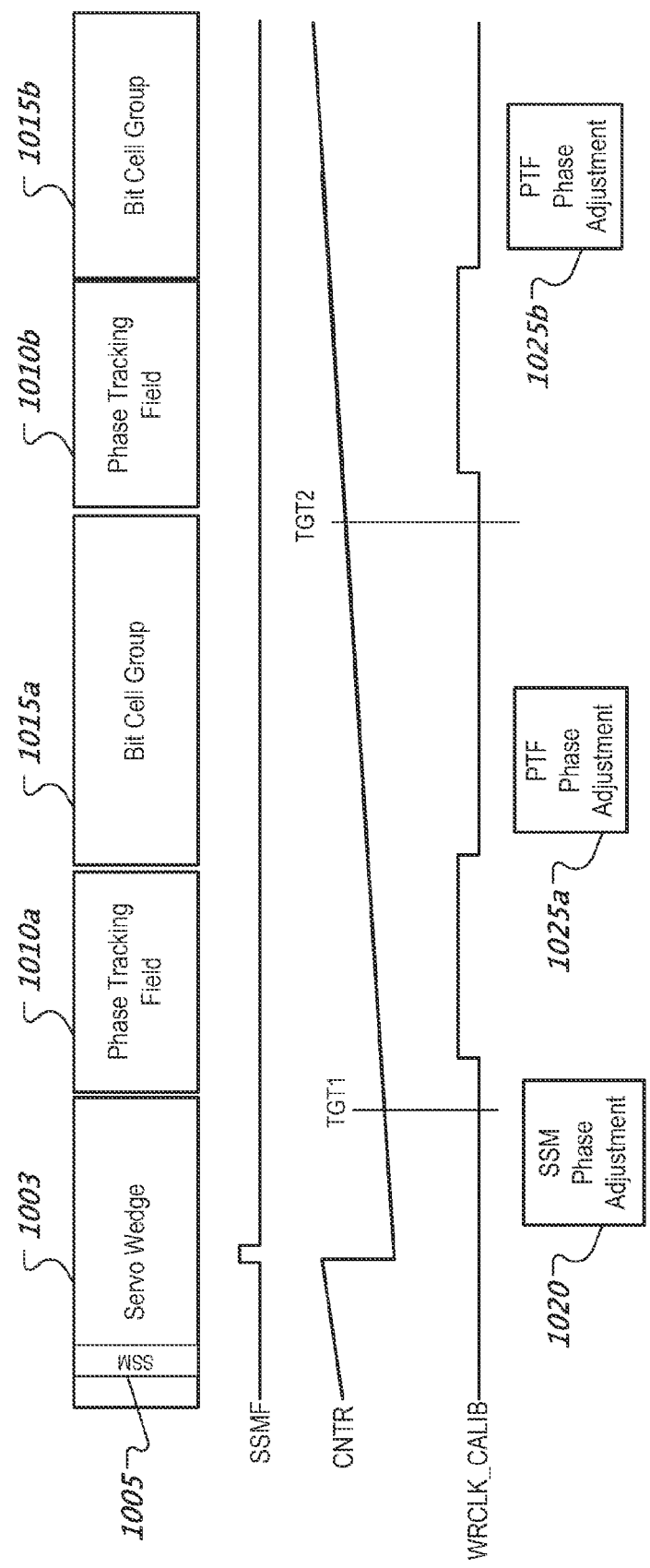
FIG. 10 shows a timing diagram example of signals associated with a write clock synchronization process.

FIG. 10 shows a timing diagram example of signals associated with a write clock synchronization process. A write clock synchronization process includes a SSM phase adjustment 1020 to synchronize a write clock based on a detection of a SSM 1005 within a servo wedge 1003. The synchronize process includes a calibration process that calibrates the write clock based on detections of PTFs 1010*a*, 1010*b*. A disk drive synchronizes to the PTFs 1010*a*, 1010*b* before writing to respectively associated bit cell groups 1015*a*, 1015*b*.

A servo detector can raise a SSM found (SSMF) signal based on a read head's passage over a SSM 1005. A calibration counter (CNTR) can be reset based on the SSMF signal. In some implementations, a write clock pulse counter is used as a calibration counter. A calibration controller can raise calibration gate (WRCLK_CALIB) signals based on the calibration counter reaching respective predetermined values (e.g., CALIB_CNTR=TGT1, CALIB_CNTR=TGT2). The predetermined values can be selected based on a layout of the PTFs 1010*a*, 1010*b* and bit cell groups 1015*a*, 1015*b*. There can be a delay between when the calibration counter reaches a predetermined value and when the calibration gate signal is raised.

During the calibration gate signal, the calibration process operates a phase detection circuit to collect data samples of the PTF 1010*a*, 1010*b* using the write clock. A PTF phase adjustment 1025*a*, 1025*b* of the calibration process can start based on receiving the collected data samples. In some implementations, at the falling edge of a calibration gate signal, a phase detection circuit can start to calculate, based on the collected data samples, a phase of a calibration signal, e.g., a portion of a read head signal that corresponds to a read head's passage over a PTF 1010*a*, 1010*b*.

Figure 11:
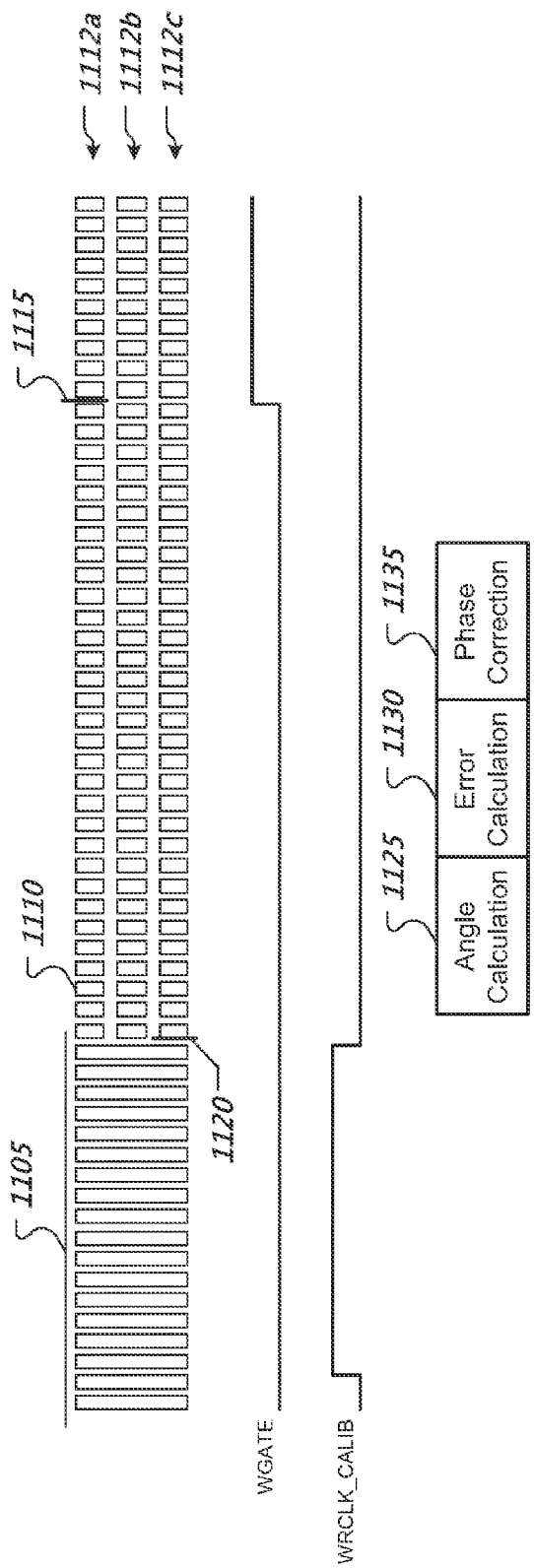
FIG. 11 shows a timing diagram example of signals associated with a write clock synchronization process.

FIG. 11 shows a timing diagram example of signals associated with a write clock synchronization process. A disk drive can include a drive head with a read head 1115 and a write head 1120. The read head 1115 and the write head 1120 are physically offset by a read/write head offset. A BPM disk includes zones that contain a PTF 1105 and bit cells 1110. A zone includes, at different circumferences, rows of track segments 1112*a*, 1112*b*, 1112*c* that have an equal number of bit cells 1110. Here, the read head 1115 is leading the write head 1120, and the associated read head signal can be used to calibrate a write clock before the write head 1120 is in a position to write to bit cells 1110 of a track segment 1112*c* in the same zone. Writing to the track segment 1112*c* can commence based on a write gate (WGATE) signal.

A calibration gate (WRCLK_CALIB) signal can precede the write gate signal. The duration of the calibration gate signal can be based on a duration that corresponds to a head's passage over a PTF 1105. Responsive to the calibration gate signal and samples of the PTF 1105, the synchronization process performs an angle calculation 1125, error calculation 1130, and a phase correction 1135. An angle calculation 1125 can include using a CORDIC to determine a phase of a portion of the read signal that corresponds to the PTF 1105. An error calculation 1130 can include comparing the determined phase with an expected phase. A phase correction 1135 can include applying a calculated phase error to adjust a phase of the write clock.

In some implementations, a medium includes a PTF after a servo wedge to correct for a phase error caused by crossing from a servo clock to a write clock. In some implementations, the track length of a PTF can be increased to compensate for a preamp turn-on time. A disk drive can use a PTF to perform a zero phase start (ZPS) for a read operation. In some implementations, a read circuit, for a data read operation, can filter out the portion of a read head signal that corresponds to a PTF.

In some implementations, a PTF is encoded by a group of data bit cells. A disk drive can write PTFs to a recording medium as required by operational system performance. If no longer required, the disk drive can overwrite a PTF with other data.

A medium can include one or more calibration patterns. In some implementations, a low frequency calibration pattern can be used for phase calibration and harmonic sensing. In some implementations, a disk drive uses a calibration pattern phase error to measure and correct a frequency error. A calibration pattern can have the same frequency as a data preamble signal. A synchronous write can allow a phase coherent write of a data sector on an adjacent track. An increased gain for a variable gain amplifier (VGA) can be required to compensate for a signal amplitude loss due to a read/write head offset.

A servo wedge can include a preamble. In some implementations, a disk drive uses a preamble as a calibration pattern. The disk format for each track of the same zone can be the same, thereby aligning the preamble areas of adjacent tracks. For BPM, a disk drive can recalibrate a write clock at every data preamble field. In some implementations, based on a sufficiently large read/write head offset, a disk drive uses a most recent calibration pattern to calibrate a write phase.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An apparatus comprising:
   circuitry configured to receive a waveform produced by a read head operated with respect to a recording medium, the medium comprising magnetic data positions, a first servo sync mark, a second servo sync mark, and phase tracking fields, wherein at least a portion of the phase tracking fields are arranged between the first servo sync mark and the second servo sync mark;
   circuitry configured to produce, based on the waveform, a servo detect pulse that indicates a detection of at least one of the servo sync marks;
   circuitry configured to control a first adjustment of a phase of a write clock signal, wherein the first adjustment is responsive to the servo detect pulse;
   circuitry configured to produce, based on the write clock signal, samples of the waveform that correspond to the phase tracking fields; and
   circuitry configured to control second adjustments of the phase of the write clock signal based on the samples to align the write clock signal with at least a portion of the data positions, wherein the second adjustments are responsive to the phase tracking fields, respectively.

2. The apparatus of claim 1, further comprising:
   circuitry configured to determine a phase of a read signal corresponding to a phase tracking field of the phase tracking fields; and
   circuitry configured to determine a phase offset based on the phase of the read signal and a target phase, wherein an adjustment of the second adjustments is based on the phase offset.

3. The apparatus of claim 1, wherein the phase tracking fields comprise two or more sets of a pattern, wherein the pattern comprises two magnetic strips having a first magnetic polarization and two magnetic strips having a second, different magnetic polarization.

4. The apparatus of claim 1, wherein the circuitry to control the first adjustment comprises circuitry configured to control an adjustment of the phase of the write clock signal based on a timing difference, wherein the timing difference is based on the servo detect pulse and a write pulse of the write clock signal.

5. The apparatus of claim 1, further comprising:
   circuitry configured to operate a counter to count clock pulses of the write clock signal; and
   circuitry configured to produce calibration pulses based on the counter reaching predetermined values, respectively, wherein the circuitry configured to control the second adjustments is responsive to the calibration pulses.

6. The apparatus of claim 1, further comprising:
   circuitry configured to control a write head to write to one or more of the data positions based on the write clock signal, and wherein the read head leads the write head with respect to the recording medium.

7. A method comprising:
   receiving a waveform produced by a read head operated with respect to a recording medium, the medium comprising magnetic data positions, a first servo sync mark, a second servo sync mark, and phase tracking fields, wherein at least a portion of the phase tracking fields are arranged between the first servo sync mark and the second servo sync mark;
   producing, based on the waveform, a servo detect pulse that indicates a detection of at least one of the servo sync marks;
   controlling a first adjustment of a phase of a write clock signal, the first adjustment being responsive to the servo detect pulse;
   producing, based on the write clock signal, samples of the waveform that correspond to the phase tracking fields; and
   controlling second adjustments of the phase based on the samples to align the write clock signal with at least a portion of the data positions, the second adjustments being responsive to the phase tracking fields, respectively.

8. The method of claim 7, further comprising:
   determining a phase of a read signal corresponding to a phase tracking field of the phase tracking fields; and
   determining a phase offset based on the phase of the read signal and a target phase, wherein an adjustment of the second adjustments is based on the phase offset.

9. The method of claim 7, wherein the phase tracking fields comprise two or more sets of a pattern, wherein the pattern comprises two magnetic strips having a first magnetic polarization and two magnetic strips having a second, different magnetic polarization.

10. The method of claim 7, wherein controlling the first adjustment comprises controlling an adjustment of the phase of the write clock signal based on a timing difference, wherein the timing difference is based on the servo detect pulse and a write pulse of the write clock signal.

11. The method of claim 7, further comprising:
    operating a counter to count clock pulses of the write clock signal; and
    producing calibration pulses based on the counter reaching predetermined values, respectively, wherein the second adjustments are responsive to the calibration pulses.

12. The method of claim 7, further comprising:
    controlling a write head to write to one or more of the data positions based on the write clock signal, wherein the read head leads the write head with respect to the recording medium.

13. A system comprising:
    clock circuitry configured to produce a write clock signal;

a recording medium, the medium comprising magnetic data positions, a first servo sync mark, a second servo sync mark, and phase tracking fields, wherein at least a portion of the phase tracking fields are arranged between the first servo sync mark and the second servo sync mark;

a read head, operated with respect to the medium, to produce a waveform;

a detector configured to produce, based on the waveform, a servo detect pulse that indicates a detection of at least one of the servo sync marks;

a first phase offset calculator configured to control a first adjustment of a phase of the write clock signal, wherein the first adjustment is responsive to the servo detect pulse;

a converter configured to produce, based on the write clock signal, samples of the waveform that correspond to the phase tracking fields;

a second phase offset calculator configured to control second adjustments of the phase of the write clock signal based on the samples to align the write clock signal with at least a portion of the data positions, wherein the second adjustments are responsive to the phase tracking fields, respectively; and a write head, operated with respect to the medium and the write clock signal, to write data to the at least the portion of the data positions.

14. The system of claim 13, further comprising:

circuitry configured to determine a phase of a read signal corresponding to a phase tracking field of the phase tracking fields; and circuitry configured to determine a phase offset based on the phase of the read signal and a target phase, wherein an adjustment of the second adjustments is based on the phase offset.

15. The system of claim 13, wherein the phase tracking fields comprise two or more sets of a pattern, wherein the pattern comprises two magnetic strips having a first magnetic polarization and two magnetic strips having a second, different magnetic polarization.

16. The system of claim 13, wherein the first phase offset calculator comprises circuitry configured to control an adjustment of the phase of the write clock signal based on a timing difference, wherein the timing difference is based on the servo detect pulse and a write pulse of the write clock signal.

17. The system of claim 13, further comprising:

circuitry configured to operate a counter to count clock pulses of the write clock signal; and circuitry configured to produce calibration pulses based on the counter reaching predetermined values, respectively, wherein the second phase offset calculator is responsive to the calibration pulses.

18. The system of claim 13, further comprising:

circuitry configured to control the write head to write to one or more of the data positions based on the write clock signal, wherein the read head leads the write head with respect to the recording medium.

19. The system of claim 13, wherein the clock circuitry comprises:

a first phase-locked-loop circuit, that includes a first voltage controlled oscillator, to produce a servo clock signal, the read head being responsive to the servo clock signal;

a second phase-locked-loop circuit, that includes a second voltage controlled oscillator, to produce the write clock signal; and a phase interpolator to adjust the phase of the write clock signal.

20. The system of claim 13, wherein the clock circuitry is configured to use a single voltage controlled oscillator to produce the write clock signal and a servo clock signal, the read head being responsive to the servo clock signal, and wherein the clock circuitry comprises:

a phase-locked-loop circuit, that includes the voltage controlled oscillator, to produce a source clock signal; and a frequency divider to produce a frequency adjusted version of the source clock signal.

* * * * *